United States Patent
Julian

(10) Patent No.: US 9,458,891 B2
(45) Date of Patent: Oct. 4, 2016

(54) CONTOURED DISC COUPLING

(71) Applicant: Goodrich Corporation, Charlotte, NC (US)

(72) Inventor: Aaron Timothy Julian, Camden, NY (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/305,672

(22) Filed: Jun. 16, 2014

(65) Prior Publication Data

US 2015/0362020 A1 Dec. 17, 2015

(51) Int. Cl.
*F16D 3/79* (2006.01)
*F16D 3/62* (2006.01)

(52) U.S. Cl.
CPC .. *F16D 3/79* (2013.01); *F16D 3/62* (2013.01)

(58) Field of Classification Search
CPC ............... F16D 3/79; F16D 3/62; F16D 3/78
USPC ........................................ 464/93–95, 98, 99
See application file for complete search history.

(56) References Cited

U.S. PATENT DOCUMENTS

| | | | |
|---|---|---|---|
| 3,062,025 A | 11/1962 | Bastow et al. | |
| 3,654,775 A | 4/1972 | Williams | |
| 3,808,837 A | 5/1974 | Anderson et al. | |
| 4,079,598 A | 3/1978 | Wildhaber | |
| 4,191,030 A | 3/1980 | Calistrat | |
| 4,523,916 A * | 6/1985 | Kizler et al. | 464/98 |
| 5,158,504 A | 10/1992 | Stocco | |
| 5,163,876 A * | 11/1992 | Zilberman et al. | 464/93 X |
| 5,286,231 A * | 2/1994 | Zilberman et al. | 464/93 |
| 6,500,071 B1 * | 12/2002 | Pollard | F16D 3/62 464/98 X |
| 6,547,666 B2 * | 4/2003 | Kropp | B26D 1/0006 464/98 |
| 8,591,345 B2 | 11/2013 | Stocco et al. | |

FOREIGN PATENT DOCUMENTS

| | | | | |
|---|---|---|---|---|
| GB | 2 192 969 A | * | 1/1988 | 464/99 |
| GB | 2342424 A | | 4/2000 | |

OTHER PUBLICATIONS

Jon Mancuso and Joe Corcoran, What are the Differences in High Performance Flexible Couplings for Turbomachinery?, Proceedings of the Thirty-Second Turbomachinery Symposium 2003, pp. 189-208.
Joe Corcoran, Douglas Lyle, Patrick McCormack and Tim Ortel, Advances in Gas Turbine Couplings, Proceedings of the Thirty-Sixth Turbomachinery Symposium 2007, pp. 157-172.
Extended European Search Report for European Patent Application No. 15171873.1, dated Jun. 1, 2016, 7 pages.

* cited by examiner

*Primary Examiner* — Gregory Binda
(74) *Attorney, Agent, or Firm* — Kinney & Lange, P.A.

(57) ABSTRACT

A contoured disc coupling includes a plurality of fastening locations, wherein each fastening location has a body portion and an aperture running through the body portion, and a plurality of webs extending between adjacent fastening locations, wherein each web has a contoured shape.

10 Claims, 4 Drawing Sheets

CONTOURED DISC COUPLING

BACKGROUND

The present invention relates to high performance flexible couplings, and in particular, to a contoured disc coupling.

Flexible couplings are used in machinery to connect a first rotating part to a second rotating part. Flexible couplings are designed to transmit torque between the rotating parts, accommodate misalignment between the rotating parts, and to compensate for end movement of either of the rotating parts. A lot of stress can be produced in the system due to the amount of torque that is being transmitted and the amount of misalignment or end movement of the rotating parts. Flexible couplings are used to transmit the torque and absorb stress. Flexible couplings can include gear couplings or metallic couplings. Gear couplings have a first and second set of gear teeth that mesh and move together to transmit torque. Metallic couplings include diaphragm couplings and disc couplings that transmit torque through the flexure of metallic material.

Diaphragm couplings and disc couplings differ in how they transmit torque and accommodate flexure of the metallic material. Diaphragm couplings are plates (or diaphragms) that can be used as a single piece or multiple pieces. Diaphragm couplings can be contoured, convoluted, or have cut-out portions. Diaphragm couplings accommodate flexure in the metal in the radial direction, either from the outer diameter to the inner diameter or vice versa. The torque is thus transferred as shear stress through the diaphragm coupling and axial and angular deflection are accommodated by bending. Disc couplings are stacks of thin flat sheets of metal that are bolted together in a stack. Disc couplings accommodate flexure in the metal between bolts. Adjacent bolts are alternately fastened to the two rotating parts so that one bolt can act as the load transmitter and the adjacent bolt can act as the load receiver. The torque is thus transferred as tensile stress through the disc coupling and axial and angular deflection are accommodated by bending.

SUMMARY

A contoured disc coupling includes a plurality of fastening locations. Each fastening location has a body portion and an aperture running through the body portion. A plurality of webs extend between adjacent fastening locations, and each web has a contoured shape.

A power transmission system includes a first shaft, a second shaft, and a disc coupling attaching the first shaft to the second shaft. The disc coupling includes a central opening, a plurality of fastening locations positioned around the central opening, and a plurality of webs that each have a contoured shape extending between the plurality of fastening locations around the central opening.

DETAILED DESCRIPTION

In general, the present disclosure includes a contoured disc coupling that can be positioned between two rotating parts to transfer torque between the two rotating parts. The contoured disc coupling includes a plurality of fastening locations with apertures through which a fastener can be placed. A plurality of webs extend between the plurality of fastening locations. Each of the webs has a contoured shape with a first thickness on a first end and a second end, and a second thickness in the center of the web. The first thickness is thicker than the second thickness, and the web tapers between the two thicknesses to create the contoured shape. The contoured shape of the webs allows each of the webs to efficiently and effectively transfer torque between adjacent fastening locations. The contoured shape of the webs also allows each of the webs to bend and flex to accommodate axial and angular deflections between the two rotating parts.

Figure 1:
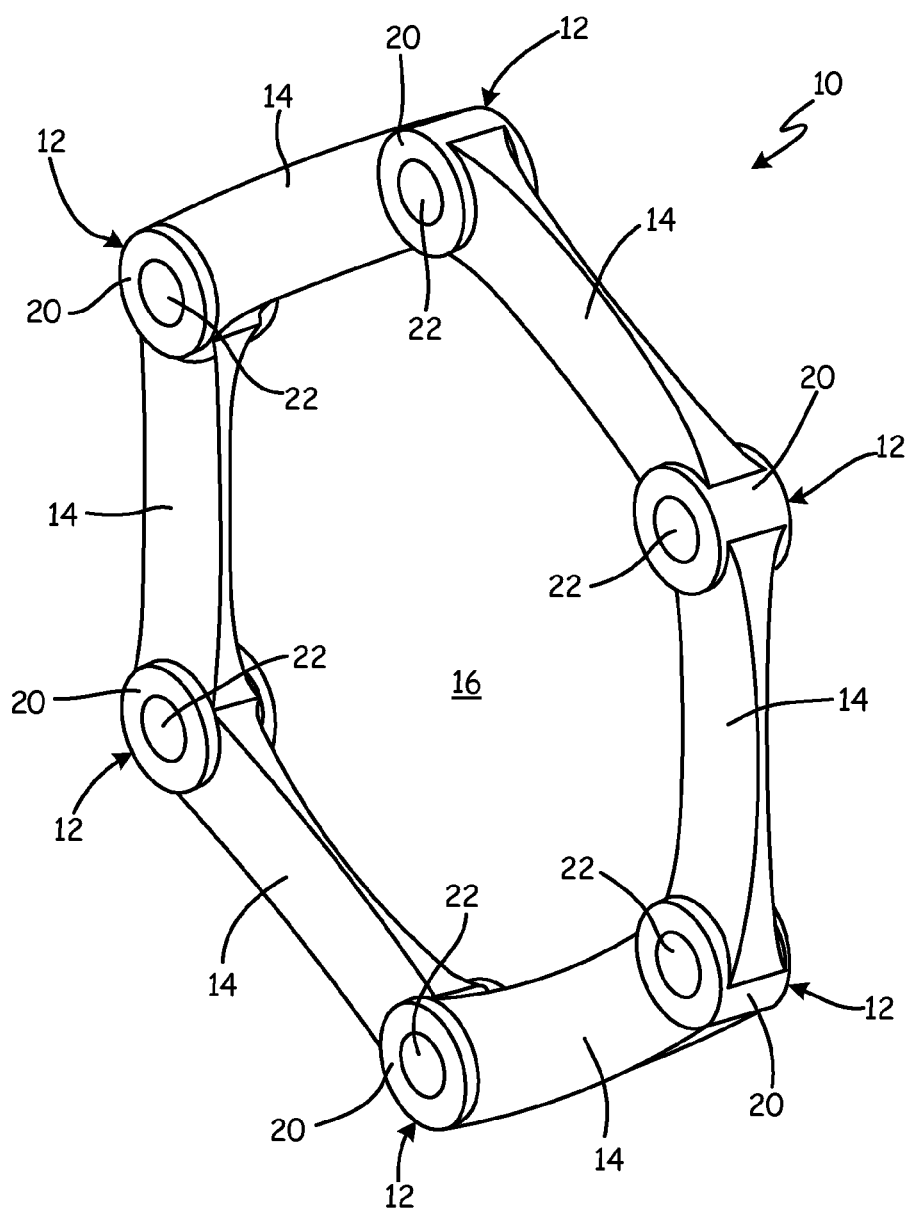
FIG. 1 is perspective view of a contoured disc coupling.

FIG. 1 is perspective view of contoured disc coupling 10. Contoured disc coupling 10 includes fastening locations 12, webs 14, and central opening 16. Each fastening location 12 includes body portion 20 and aperture 22.

Contoured disc coupling 10 includes fastening locations 12 and webs 14 that are positioned around central opening 16. Fastening locations 12 are positioned around a periphery of contoured disc coupling 10. Contoured disc coupling 10 is a single piece. Webs 14 extend between adjacent fastening locations 12 to connect fastening locations 12 together. Each fastening location 12 includes body portion 20 and aperture 22. Body portions 20 are cylindrically shaped. One aperture 22 extends from a first side to a second side of each body portion 20. Apertures 22 are capable of receiving a fastener when contoured disc coupling 10 is installed between two rotating parts.

Webs 14 are contoured with a first thickness at a first end and a second end of each web 14, and a second thickness at a center of each web. The first thickness is thicker than the second thickness in the embodiment shown. The slope of webs 14 tapers between the first end and the center and between the second end and the center. Webs 14 are contoured to accommodate tensile and bending stresses. When contoured disc coupling 10 is positioned between two rotating parts, torque will be transmitted through contoured disc coupling 10. Contoured disc coupling 10 has to withstand high tensile stresses due to the torque that will be transmitted through contoured disc coupling 10. Contoured disc coupling 10 also has to withstand high bending stresses that are associated with axial and angular deflection between the two rotating parts between which contoured disc coupling 10 is positioned.

The contoured shaped of webs 14 allows them to withstand the tensile and bending stresses stemming from the torque, speed, and axial and angular deflections of the two rotating parts. Prior art disc couplings include stacks of thin flat discs that are bolted together in a pack. These disc couplings have a potential failure mode in which the discs rub against each other, generating heat and fretting. This can ultimately lead to the formation of cracks. Contoured disc coupling 10 eliminates this potential failure mode, as contoured disc coupling 10 is a single piece and does not have multiple parts that can rub against each other to generate heat and fretting.

Contoured disc coupling 10 also has increased deflection capability compared to prior art disc couplings. This allows contoured disc coupling 10 to be used in more applications than prior art disc couplings. Further, the stresses in contoured disc coupling 10 can be more accurately predicted, make contoured disc coupling 10 more reliable than prior art disc couplings. Being able to accurately predict the stresses in contoured disc coupling 10 also allows contoured disc coupling 10 to be designed and tailored for specific uses. This allows flexibility in the design to ensure that high fatigue stresses are not located near the edges of contoured disc coupling 10.

Figure 2A:
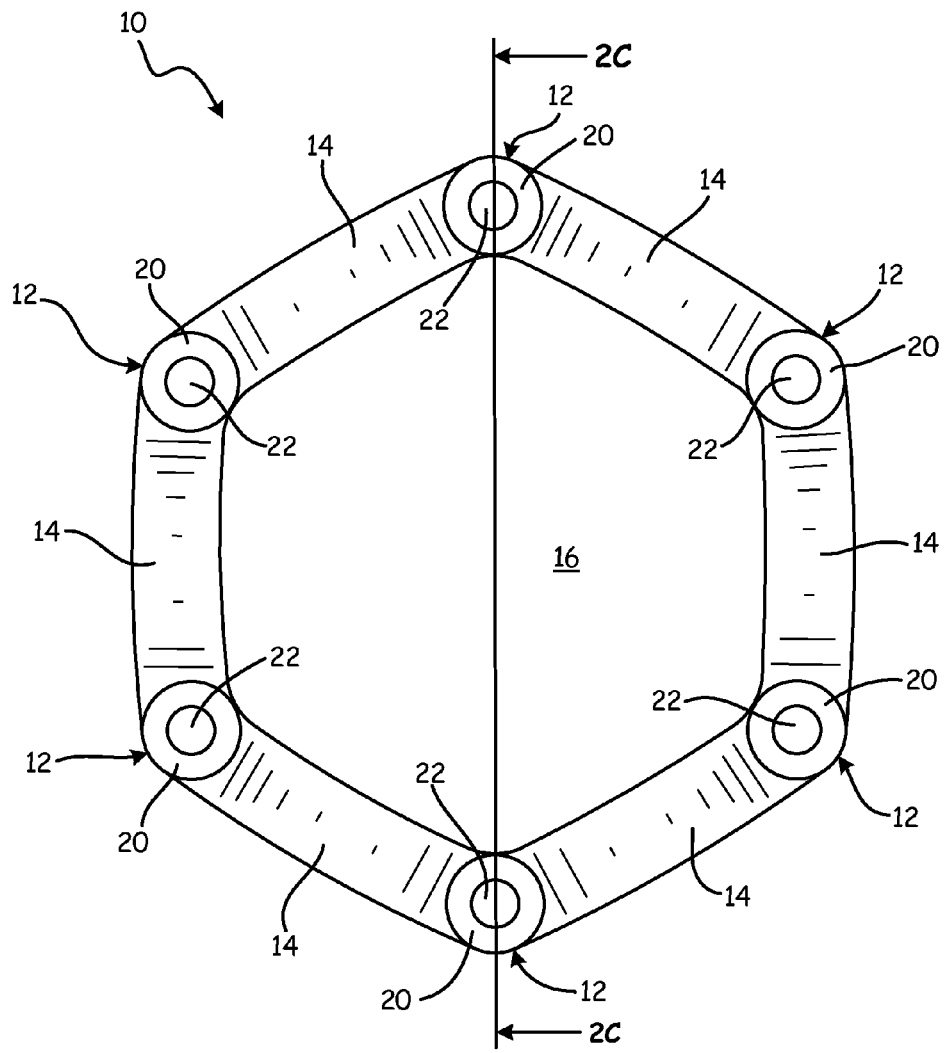
FIG. 2A is a front plan view of the contoured disc coupling.
Figure 2B:
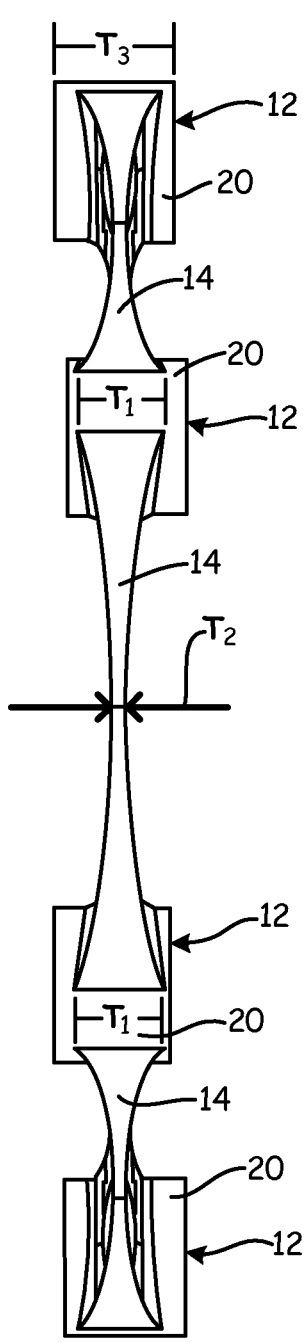
FIG. 2B is a side elevation view of the contoured disc coupling.
Figure 2C:
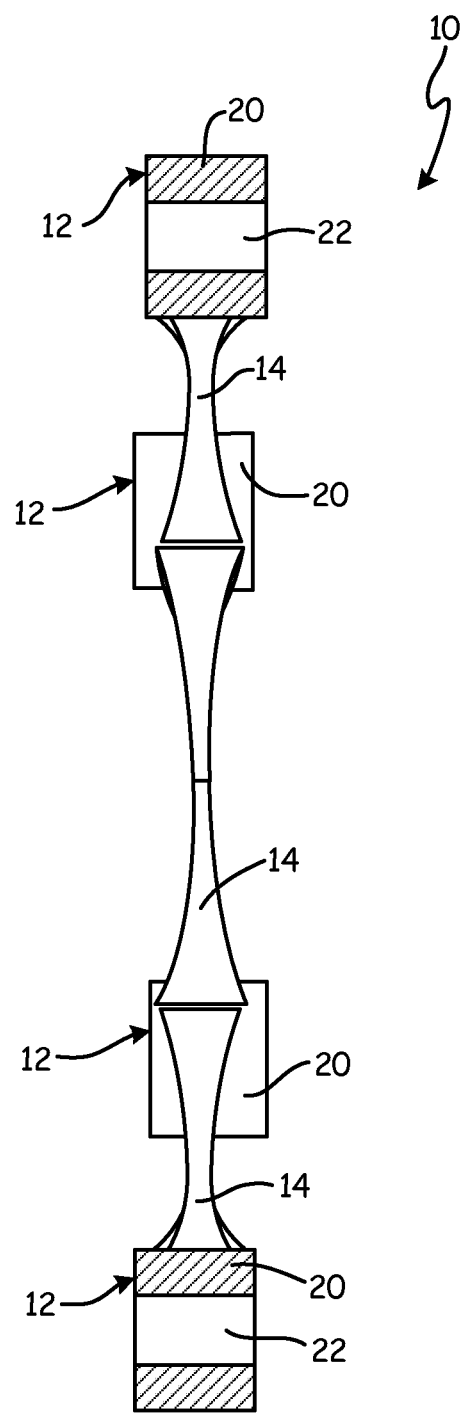
FIG. 2C is a cross-sectional side view of the contoured disc coupling taken along line 2C-2C in FIG. 2A.

FIG. 2A is a front plan view of contoured disc coupling 10. FIG. 2B is a side elevation view of contoured disc coupling 10. FIG. 2C is a cross-sectional side view of contoured disc coupling 10 taken along line C-C in FIG. 2A. Contoured disc coupling 10 includes fastening locations 12, webs 14, and central opening 16. Each fastening location 12 includes body portion 20 and aperture 22.

Contoured disc coupling 10 includes fastening locations 12 and webs 14 positioned around central opening 16. Contoured disc coupling 10 is a single piece that can be manufactured using a variety of processes. In one embodiment, contoured disc coupling 10 is an additively manufactured monolithic part. In an alternate embodiment, contoured disc coupling 10 is manufactured with a multiaxis machining manufacturing process. Contoured disc coupling 10 is made out of a metallic material in the embodiment shown, but can be made out of other suitable materials in alternate embodiments. Webs 14 extend between adjacent fastening locations 12 and are attached on either end to fastening locations 12.

Fastening locations 12 each include body portion 20 and aperture 22. Body portions 20 are cylindrically shaped and apertures 22 run from a first side to a second side of each body portion 20. Apertures 22 are capable of receiving a fastener when contoured disc coupling 10 is installed between two rotating parts.

Webs 14 each have a contoured shape with first thickness $T_1$ at a first end and a second end of each web 14, and second thickness $T_2$ in the center of each web 14. First thickness $T_1$ is larger than second thickness $T_2$ in the embodiment shown. This difference in thickness gives webs 14 their contoured shape, as each web 14 tapers from first thickness $T_1$ to second thickness $T_2$. Fastening locations 12 have third thickness $T_3$ that is larger than first thickness $T_1$. Third thickness $T_3$ is larger than first thickness $T_1$ so that webs 14 can attach to fastening locations 12 and be positioned a distance away from the front and back surface of fastening locations 12.

Contoured disc coupling 10 is designed to transmit torque in tension between fastening locations 12. One fastening location 12 acts as a load distributor and an adjacent fastening location 12 acts as a load receiver. In order for torque to be efficiently transmitted between adjacent fastening locations 12, webs 14 have to be capable of withstanding high tensile and bending stresses. The tensile stresses come from the transfer of torque across webs 14 and the bending stresses come from the axial and angular deflections of the rotating parts between which contoured disc coupling 10 is positioned. Contoured disc coupling 10 is designed to evenly distribute the tensile and bending stresses across webs 14.

First thickness $T_1$ and second thickness $T_2$ of webs 14 are selected to evenly distribute the tensile and bending stresses in contoured disc coupling 10. In the center of webs 14 the only significant stresses are tensile stresses from torque and some bending stress from angular velocity. Second thickness $T_2$ of the center of web 14 is thus selected based solely on the torque required for any given application. Second thickness $T_2$ tapers to first thickness $T_1$ in both directions. The taper is designed to distribute bending stresses along a face of each of webs 14. Thus, first thickness $T_1$ at the first end and second end of each web 14 is selected in light of the taper required to accommodate the bending stresses that will be present in any given application. Third thickness $T_3$ is selected so that webs 14 can be attached to fastening locations 12 a distance away from the front or back face of fastening locations 12. This prevents fatigue and fretting on the first end and the second end of webs 14.

Prior art disc couplings consisted of thin flat discs that were stacked together. Some of the problems present with prior art disc couplings include the following. First, deflection of the discs was limited depending on where the disc was positioned in the stack. Second, stress due to bending was concentrated around the fastening locations, causing fretting in these areas. Third, the discs in the stack rubbed together and generated heat, leading to fractures in the discs.

Contoured disc coupling 10 eliminates the problems present in prior art disc couplings. First, contoured webs 14 allow contoured disc coupling 10 to deflect more than was previously possible, as the contoured shape more easily accommodates bending stresses. Further, contoured disc coupling 10 is a single piece, allowing webs 14 to more easily deflect. Second, the contoured shape of webs 14 is designed to transfer bending stresses away from fastening locations 12 and out into webs 14. This prevents fretting around fastening locations 12. Third, contoured disc coupling 10 is a single piece so there are no moving parts that can rub together to generate heat and potentially cause fracturing.

Another advantage of contoured disc coupling 10 is that the contoured design can be tailored so that the highest fatigue stresses in contoured disc coupling 10 are not located near an edge. Prior art disc couplings faced this problem, as the surface finish and exact contour of the disc edge were difficult to control during manufacturing. The imprecision in the surface finish and disc edge contour caused prior art disc couplings to experience fatigue near surfaces of the disc coupling. Contoured disc coupling 10 has eliminated this problem, as the contoured shape of webs 14 is designed such that the highest fatigue stresses occur in flat, wide areas of contoured disc coupling 10 where the surface finish can be tightly controlled and inspection is much easier.

A further advantage of contoured disc coupling 10 is that the stresses in contoured disc coupling 10 can be accurately predicted. More accurately predicting the stresses in contoured disc coupling 10 allows for the design of contoured disc coupling 10 to be optimized. Further, being able to more accurately predict the stresses in contoured disc coupling 10 allows for greater reliability in using contoured disc coupling 10 in different settings. This expands the applications in which contoured disc coupling 10 can be used compared to prior art disc couplings. The applications of prior art disc couplings were limited because the design either could not meet operational needs or because the reliability of the disc coupling could not be accurately established. Contoured disc coupling 10 eliminates these concerns and contoured disc coupling 10 can be used in broader applications than was previously possible.

Figure 3:
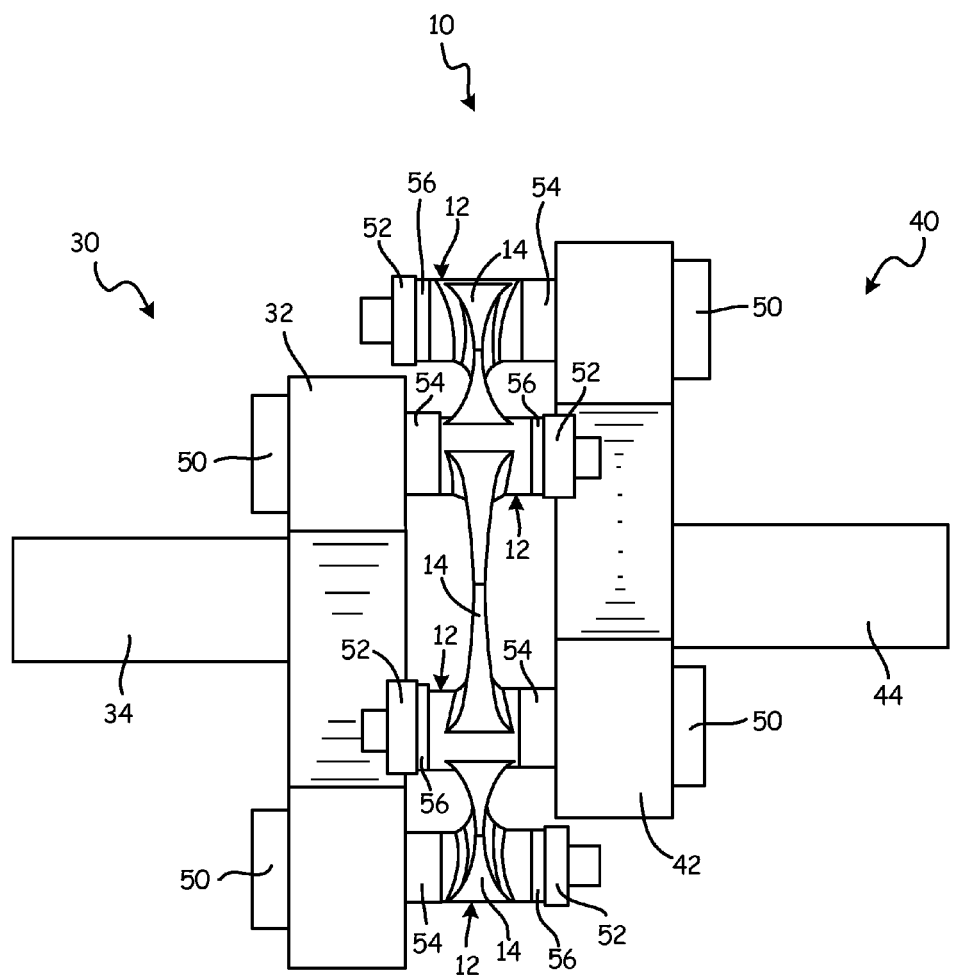
FIG. 3 is a side elevation view of the contoured disc coupling positioned between a first rotating part and a second rotating part.

FIG. 3 is a side elevation view of contoured disc coupling 10 positioned between first rotating part 30 and second rotating part 40. Disc coupling 10 includes fastening locations 12 and webs 14. First rotating part 30 includes fastening plate 32 and shaft 34. Second rotating part 40 includes fastening plate 42 and shaft 44. Also shown are fasteners 50, nuts 52, spacers 54, and washers 56.

Disc coupling 10 is positioned between first rotating part 30 and second rotating part 40. Disc coupling 10 includes fastening locations 12 and webs 14 that extend between adjacent fastening locations 12. Webs 14 have a contoured shape with first thickness $T_1$ at a first end and a second end of web 14, and a second thickness $T_2$ in the center of web 14. Each fastening location 12 includes an aperture through which a fastener can pass. First rotating part 30 includes fastening plate 32 and shaft 34. Fastening plate 32 includes a plurality of apertures through which a fastener can pass. Second rotating part 40 includes a fastening plate 42 and shaft 44. Fastening plate 42 includes a plurality of apertures through which a fastener can pass. Fastening plate 32 and fastening plate 42 are tri-lobed plates in the embodiment shown in FIG. 3, but can by any suitable plate, including scalloped or triangular plates, in alternate embodiments. Each aperture in fastening locations 12 is aligned with an aperture in either fastening plate 32 or fastening plate 42. This allows a fastener to pass through an aperture in one of fastening plate 32 or fastening plate 42 and then through fastening location 12.

Fasteners 50 are used to connect first rotating part 30 to second rotating part 40 with contoured disc coupling 10 positioned in between. Fasteners 50 are alternately fastened to first rotating part 30 and second rotating part 40 so that one fastening location 12 can act as a load transmitter and an adjacent fastening location 12 can act as a load receiver. Fasteners 50 are placed through the apertures in fastenings locations 12 and through an aperture in either fastening plate 32 or fastening plate 42. Spacers 54 are provided to space contoured disc coupling 10 away from fastening plate 32 and fastening plate 42. Washers 56 are positioned between nuts 52 and contoured disc coupling 10. In alternate embodiments, spacers 54 and washers 56 can be eliminated.

As shown in the embodiment seen in FIG. 3, as shaft 34 of first rotating part 30 rotates, torque will be transmitted through contoured disc coupling 10 to rotate shaft 44 of second rotating part 42. Torque is transmitted from fasteners 50 that are attached to fastening plate 32, through contoured disc coupling 10, and into fasteners 50 that are attached to fastening plate 42. Torque can also be transmitted in the opposite direction if second rotating part 40 is driving first rotating part 30. The torque is transmitted through contoured disc coupling 10 as tensile stress along webs 14. The contoured design of webs 14 allows webs 14 to flex and accommodate for misalignment between first rotating part 30 and second rotating part 40.

Contoured disc coupling 10 is advantageous over prior art disc couplings. Contoured disc coupling 10 transmits torque more efficiently and effectively than prior art disc couplings and can deflect more to accommodate the stresses put on it. The stresses that will be present in contoured disc coupling 10 in any given setting can also be more accurately projected. This allows contoured disc coupling 10 to be designed with more precision depending on what application it will be used in. This allows contoured disc coupling 10 to be used in more settings than was previously possible.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A contoured disc coupling comprising:
a plurality of fastening locations, wherein each fastening location has a body portion with a first face and a second face opposite the first face, and an aperture running through the body portion from the first face to the second face; and
a plurality of webs extending between adjacent fastening locations, wherein each web has a contoured shape, wherein each web has a first thickness ($T_1$) at a first end of the web and at a second end of the web, and a second thickness ($T_2$) in the middle of the web;
wherein the body portion of the fastening location has a third thickness ($T_3$) from the first face to the second face that is greater than the first thickness ($T_1$) of the first end of the web and the second end of the web, wherein the first end of the web and the second end of the web are positioned a distance away from the first face and the second face of the fastening locations; and
wherein the contoured disc coupling is a monolithic piece and the plurality of fastening locations and the plurality of webs are made out of a metallic material.

2. The contoured disc coupling of claim 1, wherein the first thickness—($T_1$) is greater than the second thickness ($T_2$).

3. The contoured disc coupling of claim 2, wherein each of the plurality of webs tapers between the first thickness ($T_1$) and the second thickness ($T_2$), wherein the tapered webs distribute bending stresses along a face of each of the webs.

4. The contoured disc coupling of claim 1, wherein the plurality of fastening locations are positioned around a periphery of the contoured disc coupling.

5. The contoured disc coupling of claim 1, wherein the plurality of fastening locations and the plurality of webs are positioned around a central opening.

6. The contoured disc coupling of claim 1, wherein the contoured disc coupling is additively manufactured.

7. A power transmission system comprising:
a first shaft;
a second shaft; and
a disc coupling attaching the first shaft to the second shaft, wherein the disc coupling further comprises:
a central opening;
a plurality of fastening locations positioned around the central opening, wherein each of the fastening locations has a body portion with a first face and a second face; and
a plurality of webs that each have a contoured shape extending between the plurality of fastening locations around the central opening, wherein each web has a first thickness ($T_1$) at a first end of the web and at a second end of the web, and a second thickness ($T_2$) in a middle of the web;
wherein the body portion of each fastening location has a third thickness ($T_3$) from the first face to the second face that is greater than the first thickness ($T_1$) of the first end of each of the webs and the second end of each of the webs, wherein the first end of each of the webs and the second end of each of the webs are positioned a distance away from the first face and the second face of each of the fastening locations; and
wherein the contoured disc coupling is a monolithic piece and the plurality of fastening locations and the plurality of webs are made out of a metallic material.

8. The power transmission system of claim 7, wherein the first thickness ($T_1$) is greater than the second thickness ($T_2$).

9. The power transmission system of claim 7, wherein each of the plurality of webs tapers between the first thickness ($T_1$) and the second thickness ($T_2$), wherein the tapered webs distribute bending stresses along a face of each of the webs.

10. The power transmission system of claim 7, wherein the disc coupling is additively manufactured.

\* \* \* \* \*